United States Patent [19]
Johnson et al.

[11] 3,725,401
[45] Apr. 3, 1973

[54] NOVEL 3-AMINO-5-BROMO-2H-1,4-THIAZINES

[75] Inventors: Francis Johnson, Newton Lower Falls, Mass.; Wilmonte A. Nasutavicus, Oakland, Calif.

[73] Assignee: The Dow Chemical Company, Midland, Mich.

[22] Filed: Sept. 16, 1968

[21] Appl. No.: 762,335

[52] U.S. Cl. .................260/243, 71/90, 260/999
[51] Int. Cl. ............................................C07d 93/10
[58] Field of Search .....................260/243, 243 B

[56]  References Cited

UNITED STATES PATENTS 2,363,330  11/1944  Jackson et al. ...............260/243 X
2,963,476  12/1960  de Stevens.....................260/243

Primary Examiner—John M. Ford
Attorney—Griswold and Burdick and C. E. Rehberg

[57]  ABSTRACT

New compounds of the formula

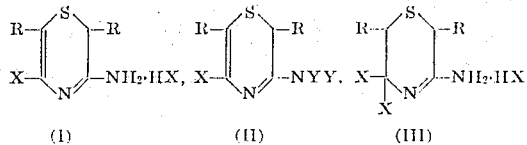

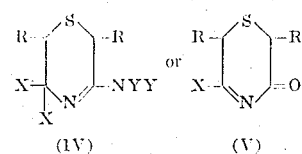

wherein X is chloro, bromo or iodo, R is hydrogen, alkyl, aryl, aralkyl, alkaryl, alkoxyaryl, haloaryl, nitroaryl, cycloalkyl, haloalkyl, nitro, halo, acetamido or lower alkyl carbethoxy, Y is hydrogen, alkarylsulfonyl, arylsulfonyl or

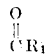

and $R_1$ is lower alkyl, lower haloalkyl, cycloalkyl, aryl, nitroaryl or haloaryl, are prepared in the novel cyclization reaction (i) comprising reacting a dinitrile of the formula NC—CH(R)—S—CH(R)—CN with at least three molar equivalents of HX at a temperature between about −50°C. and about 50°C., or in the reaction (ii) wherein the neutralized reaction product of (i) is further reacted with YX,

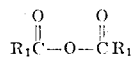

or $R_2CNO$ and $R_2$ is aryl or alkyl or in the reaction (iii) wherein the neutralized reaction product of (i) is further reacted with HBr and an aqueous alcohol solution at reflux temperature. The new compounds are useful as chemical intermediates or in neutralizing acids and as fungicides, herbicides and insecticides.

17 Claims, No Drawings

NOVEL 3-AMINO-5-BROMO-2H-1,4-THIAZINES

SUMMARY OF THE INVENTION

It has now been discovered that new compounds of the formula

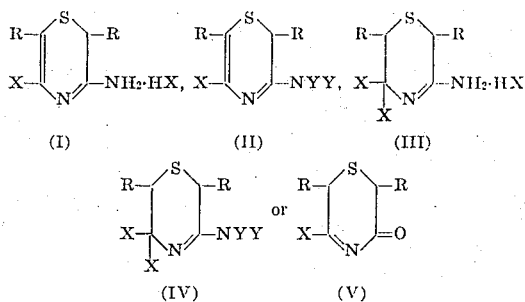

wherein X is chloro, bromo or iodo, R is hydrogen, alkyl, aryl, aralkyl, alkaryl, alkoxyaryl, haloaryl, nitroaryl, cycloalkyl, haloalkyl, nitro, halo, acetamido or lower alkyl carbethoxy, Y is hydrogen, alkarylsulfonyl, arylsulfonyl or

and $R_1$ is lower alkyl, lower haloalkyl, cycloalkyl, aryl, nitroaryl or haloaryl, are prepared in the novel cyclization reaction (i) comprising reacting a dinitrile of the formula NC—CH(R)—S—CH(R)—CN with at least three molar equivalents of HX at a temperature between about −50°C. and about 50°C., or in the reaction (ii) wherein the neutralized product of (i) is further reacted with YX,

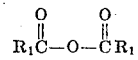

or $R_2NCO$ and $R_2$ is aryl or alkyl, or in the reaction (iii) wherein the neutralized reaction product of (i) is further reacted with HBr and an aqueous alcohol solution at reflux temperatures. The new compounds are useful as chemical intermediates or in neutralizing acids and as fungicides, herbicides and insecticides.

The novel cyclization reaction comprises reacting by contacting a dinitrile of the formula NC—CH(R)—S—CH(R)—CN with at least three molar equivalents of anhydrous HX, X being chloro, bromo or iodo and is preferably bromo.

The cyclization reaction temperature is suitably a temperature between about −50°C. and about 50°C. and is preferably between about −5°C. and about 5°C. At temperatures below about −50°C., the reaction rate is low, and at temperatures above about 50°C. the product yield is substantially lowered due to product decomposition and/or the occurrence of side reactions, such as polymerization.

Pressure on the cyclization reaction is not critical and is suitably atmospheric or super- or subatmospheric. Atmospheric pressure was conveniently used in running the exemplary reactions. The reaction time may vary from a few minutes to a few hours depending upon the reaction rate, but generally the reaction rate is quite high and the reaction is completed in 30–60 minutes. The reaction should be run under substantially anhydrous conditions.

The R substituents are suitably any group that remains inert during the cyclization reaction and are preferably hydrogen, aryl, alkoxyaryl, haloaryl, alkyl or haloalkyl and most preferably are aryl or alkyl of 1 to about 10 carbon atoms. Examples of suitable dinitrile compounds include: thiodiacetonitrile, 2,2'-thiodiproprionitrile, 2,2'-thiodibutyronitrile, thiobis(phenyl-acetonitrile), thiobis(o-chlorophenylacetonitrile), thiobis(p-chlorophenylacetonitrile), thiobis(m-nitro phenylacetonitrile), thiobis(2,4-dichlorophenylacetonitrile), thiobis(o-tolylacetonitrile), thiobis(p-isopropylphenylacetonitrile), thiobis(2-chloro-4-ethylphenylacetonitrile), thiobis(o-methoxyphenylacetonitrile), thiobis(p-butoxy-phenylacetonitrile), thiobis(chloroacetonitrile), thiobis(nitroacetonitrile), thiobis(acetamidoacetonitrile), thiobis(carbethoxyethylacetonitrile), thiobis(carbethoxybutylacetonitrile), 2,2'-thiobis(1-bromopropionitrile), and other like compounds.

The cyclization reaction above produces compounds I and III. Compounds II and IV are then easily prepared by neutralizing the respective acid salts, i.e. compounds I and III, and further reacting the thus freed amino compounds with known acylating reagents under known acylating conditions. The acylating reagents are suitably the acid halides, acid anhydrides, aryl isocyanates or alkyl isocyanates and correspond to the formula YX,

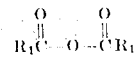

$R_2NCO$ wherein X, Y, $R_1$ and $R_2$ are as defined above. The acylating reagent may replace one or both hydrogens of the amino group. Examples of such known acylating reagents include: acetyl chloride, chloroacetyl chloride, propionyl chloride, acetic anhydride, trichloroacetic anhydride, benzenesulfonyl chloride, toluenesulfonyl chloride, 2,4-dibromobenzoid anhydride, benzoic anhydride, phenylisocyanate, tolylisocyanate, ethylisocyanate, and other like compounds.

Compound I is alternatively prepared from compound III by reacting by contacting compound III with an acid anhydride, such as acetic anhydride, at ambient temperatures.

Compound V is prepared by reacting by contacting hydrobromic acid with a solution of compound I, water and a water-soluble alcohol, at reflux temperature for a time sufficient to change a substantial amount of compound I into compound V. Preferred alcohols include methanol, ethanol or propanol and mixtures of such alcohols.

SPECIFIC EMBODIMENTS

The following examples further illustrate the invention:

EXAMPLE 1

5-Amino-3,3-dibromo-3, 6-dihydro-2H-1,4-thiazine hydrobromide

Thiodiacetonitrile (1.5 g.) was dissolved in a mixture of methylene chloride (50 ml.) and ethyl ether (50 ml.) and treated for 30 minutes at 0°C. with a stream of anhydrous hydrogen bromide. A deposition of white needles began to occur within several minutes after the introduction of the hydrogen bromide. At the end of the reaction the solvent was removed by filtration under a slight positive pressure of nitrogen. The product was washed two times with anhydrous ether and dried by a stream of nitrogen. The compound (4.3 g.) begins to turn gray at 175°–185°C. and decomposes at 190°–194°C.

Anal: Calcd. for $C_4H_7Br_3N_2S$: C, 13.5; H, 200; Br, 67.6; N, 7.9; S, 9.0.
Found C, 13.7; H, 2.2; Br, 67.7; N, 7.9; S, 9.2.

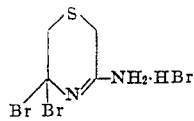

EXAMPLE 2

3-Amino-5-bromo-2H-1, 4-thiazine hydrobromide

5-Amino-3, 3-dibromo-3, 6-dihydro-2H-1, 4-thiazine hydrobromide (3.5 g.) was added to acetic anhydride (75 ml.) and the mixture stirred for two hours under nitrogen. The suspended solid was then removed by filtration, washed two times with anhydrous ether and air dried to give analytically pure material (2.6 g., 96 percent yield). It had a m.p. 183°–5°C.

Anal: Calcd. for $C_4H_6Br_2N_2S$: C, 17.5; H, 2.2; Br, 58.3; N, 10.2; S, 11.7.
Found: C, 17.5; H, 2.2; Br, 57.8; N, 10.0; S, 11.6.

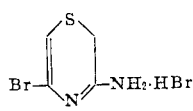

EXAMPLE 3

3-Amino-5-bromo-2H-1, 4-thiazine

Method A — The hydrobromide of Example 2 (0.6 g.) was dissolved in a minimum amount of methanol (ca. 5 ml.) and poured into saturated aqueous sodium bicarbonate (20 ml.). Within a few minutes, shiny white platelets precipitated out of solution. The product was removed by filtration and air dried to give a yield of 0.3 g.; 71 percent. The analytical sample was prepared from methylene chloride- petroleum ether and had a m.p. 120°–122°.

Anal: Calcd. for $C_4H_5BrN_2S$: C, 24.9; H, 2.6; Br, 41.4; N, 14.5; S, 16.6.
Found: C, 24.8; H, 2.5; Br, 41.5; N, 14.3; S, 16.7.

Method B — Thiodiacetonitrile (1.5 g.) was dissolved in a mixture of methylene chloride (50 ml.) and ether (50 ml.) and treated for 30 minutes at 0°C. with a stream of anhydrous hydrogen bromide. Then the reaction flask was allowed to remain for an additional 30 minutes at 0°C. At the end of this time the entire reaction was poured into saturated aqueous sodium bicarbonate (150 ml.). Sufficient solid sodium bicarbonate was added to bring the ph to 7. The aqueous layer was extracted three times with methylene chloride (100 ml.) and the organic extracts were combined, dried over magnesium sulfate and concentrated in vacuo. The product (1.2 g.; 63 percent) obtained by dilution with petroleum ether, had an infrared spectrum identical with that of the product of Method A.

EXAMPLE 4

3-Amino-5-Bromo-2, 6-Bis(o-Methoxyphenyl)-2H-1, 4-Thiazine Hydrobromide

A cooled solution of thiobis(o-methoxyphenylacetonitrile) (1.0 g.) in dry methylene chloride-ether (1:1; 60 ml.) was treated with a slow stream of anhydrous hydrogen bromide for one half hour. At the end of this time the solvent was removed under reduced pressure to leave a greenish-brown syrup. Acetic anhydride (25 ml.) was added and the reaction mixture was then stored overnight at 5°. Since there did not appear to be many crystals, ethyl ether (40 ml.) was added and the reaction stored again overnight at 5°. The pale yellow salt (1.2 g.) was filtered off and recrystallized from methanol-acetone-ether with m.p. of 196°–8°C.

Anal: Calcd. for $C_{18}H_{18}Br_2N_2O_2S$: C, 44.6; H, 3.7; Br, 32.9; N, 5.2; S, 6.6.

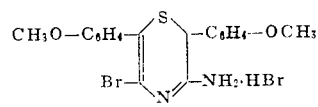

Found: C 44.4; H, 3.8; Br, 32.6; N, 5.7; S, 6.7.

EXAMPLE 5

3-Amino-5-Bromo-2, 6-Diphenyl-2H-1, 4-Thiazine Hydrobromide.

Using the procedure described in Example 4 thiobis(phenylacetonitrile) (2.1 g.) was converted to the corresponding thiazine hydrobromide (2.6 g.). The analytical sample was prepared from methanol-acetone-ether as white glistening needles and decomposed at 220°–2°C.

Anal: Calcd. for $C_{16}H_{14}Br_2N_2S$: C, 45.1; H, 3.3; Br, 37.5; N, 6.6; S, 7.5

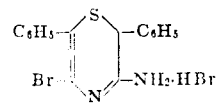

Found: C, 45.2; H, 3.4; Br, 37.2; N, 6.6; S, 7.6.

EXAMPLE 6

3-Amino-5-Bromo-2, 6-Bis(o-Chlorophenyl)-2H-1, 4-Thiazine Hydrobromide

In a manner similar to Examples 4 and 5 thiobis(o-Chlorophenylacetonitrile) (1.0 g.) was cyclized to the corresponding thiazine hydrobromide (1.0 g.). Recrystallization from methanol-ether gave the analytical sample, m.p. 235°–40°C.

Anal: Calcd. for $C_{16}H_{12}Cl_2Br_2N_2S$: C, 38.8; H, 2.4; Br, 32.3; Cl, 14.3; N, 5.7; S, 6.5.

Found: C, 38.5; H, 2.8; Br, 31.9; Cl, 14.1; N, 5.7; S, 6.5

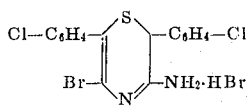

EXAMPLE 7

3-Amino-5-Bromo-2, 6-diphenyl-2H-1, 4-Thiazine

The product of Example 5 (0.5 g.) was dissolved in a minimum amount of metnanol (10 ml.) and poured into a stirred solution of excess sodium bicarbonate. The fluffy precipitate was removed by filtration and dried in air (0.4 g.). Recrystallization from methylene chloride-ether resulted in yellow needles, m.p. 193°–5 °C.

Anal: Calcd. for $C_{16}H_{13}BrN_2S$: C, 55.7; H, 3.8; Br, 23.1; N, 8.1; S, 9.3.
Found: C, 55.4; H, 3.6; Br, 23.4; N, 8.2; S, 9.4.

EXAMPLE 8

3-Amino-5-Bromo-2, 6-Bis(o-Methoxyphenyl)-2H-1, 4-Thiazine

Using the procedure as described in Example 7, the product of Example 4(0.25 g.) was neutralized to give the free base (0.20 g.) as pale yellow needles with m.p. 202°–5C.

Anal: Calcd. for $C_{18}H_{17}BrN_2O_2S$: C, 53.3; H, 4.2; Br, 19.7; N, 6.9; S, 7.9.
Found: C, 53.0; H, 4.2; Br, 19.5; N, 7.0; S, 7.8.

EXAMPLE 9

3-Amino-5-Bromo-2, 6-Bis(o-Chlorophenyl)-2H-1, 4Thiazine.

In a manner similar to Examples 7 and 8, the product of Example 6 (0.9 g.) was neutralized to give the free base (0.7 g.), yellow prisms with a melting point that bubbled at 105°C. and a final decomposition at 200°C. The analytical sample was crystallized as an etherate from ethyl ether-petroleum ether.

Anal: Calcd. for $C_{20}H_{21}BrCl_2NOS$: C, 49.2; H, 4.3; Br, 16.4; N, 5.7; S, 6.6.
Found: C, 49.1; H, 4.3; Br, 16.3; Cl, 14.4; N, 5.8; S, 6.6.

EXAMPLE 10

3Acetamido-5-Bromo-2, 6-Diphenyl-2H-1, 4-Thiazine

3-Amino-5-bromo-2, 6-diphenyl-2H-1, 4-thiazine (0.4 g.) was added to acetic anhydride (10 ml.) and heated on the steam bath for 45 minutes. The excess anhydride was removed under reduced pressure and the gummy yellow residue crystallized from methylene-chloride-ether. Two crops of crystals were combined to give 0.3 g. of yellow needles whose m.p. is 186°–7°C.

Anal: Calcd. for $C_{18}H_{15}BrN_2OS$: C, 55.8; H, 3.9; Br, 20.6; N, 7.2; S, 8.3.
Found: C, 56.0; H, 3.9; Br, 20.6; N, 7.2; S, 8.2.

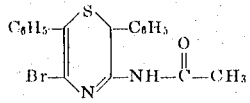

EXAMPLE 11

1-(5-Bromo-2H-1, 4-thiazine-3-YL)-3-Methyl Urea

To a solution of 3-amino-5-bromo-2H-1, 4-thiazine (0.78 g.) in tetrahydrofuran (10 ml.) was added methylisocyanate (0.23 g.) in the same solvent (5 ml). After one hour at room temperature, the solvent was removed under reduced pressure. The resultant solid (0.8 g.) was recrystallized from methylene chloride-petroleum ether as long pale yellow needles and melted at 125°–130°C.

Anal: Calcd. for $C_6H_8BrN_3OS$: C, 28.8; H, 3.2; Br, 32.0; N, 16.8; S, 12.8.
Found: C, 28.8; H, 3.2; Br, 32.2; N, 17.0; S, 13.0.

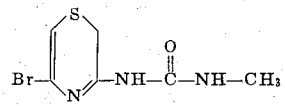

EXAMPLE 12

1-(5-Bromo-2H-1, 4-thiazine-3-YL)-3-Phenyl Urea

A solution of 3-amino-5-bromo-2H-1, 4-thiazine (0.4 g.) in tetrahydrofuran (10 ml.) was treated with phenyl isocyanate (0.25 g.) in the same solvent (5 ml.). After one hour the precipitated solid (0.6 g.) was removed by filtration. Recrystallization from tetrahydrofuran-methylene chloride afforded the analytical specimen m.p. 180°–2°.

Anal: Calcd. for $C_{11}H_{10}BrN_3OS$: C, 42.3; H, 3.2; Br, 25.6; N, 13.5; S, 10.3.
Found: C, 41.9; H, 3.2; Br, 25.4; N, 13.2; S, 10.1.

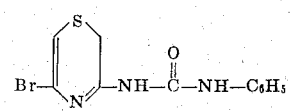

EXAMPLE 13

5-Bromo-2, 6-Diphenyl-2, 4H-1, 4-Thiazionone-3

To a solution of 3-amino-5-bromo-2, 6-diphenyl-2H-1, 4-thiazine hydrobromide (1.0 g.) in aqueous ethanol (1.3; 30 ml.) was added hydrobromic acid (50 percent; 0.5 ml.) and the reaction refluxed for eight hours. At the end of this time most of the ethanol was removed under reduced pressure and the resultant precipitate (0.5 g.) removed by filtration. Analytical sample prepared from acetone-petroleum ether as pale yellow prisms with a m.p. 189°–90°C.

Anal: Calcd. for $C_{16}H_{12}BrNOS$: C, 55.5; H, 3.5; Br, 23.1; N, 4.0; S, 9.3.
Found: C, 55.2; H, 3.7; Br, 23.4; N, 4.2; S, 9.1.

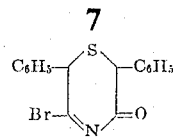

The subject compounds corresponding to formulas II, IV and V are useful in neutralizing acids. Such compounds may be used, for example, to remove acidic gases, such as $SO_2$, HCl etc., from a gas stream.

The biological utility of the subject compounds is demonstrated by the following:

An aqueous solution of the products of Examples 1 and 2, concentration 500 parts per million by weight, was effective in destroying Trichophton Mentagrophytes, and an aqueous solution of the product of Example 1, applied as a spray-concentration 4 parts per million by weight, was effective in killing corn.

An aqueous solution of the product of Examples 3, 4 and 6, concentration 500 parts per million by weight, applied as a spray, was effective in killing insects such as the Housefly, Two-Spotted Spider Mite and the Southern Army Worm.

The product of Example 5 was found to destroy or substantially inhibit growth of acid fast bacteria in an agar medium-concentration 500 parts per million by weight.

The remaining compounds are similarly useful as bases, fungicides, herbicides and/or insecticides.

We claim:

1. A compound of the formula

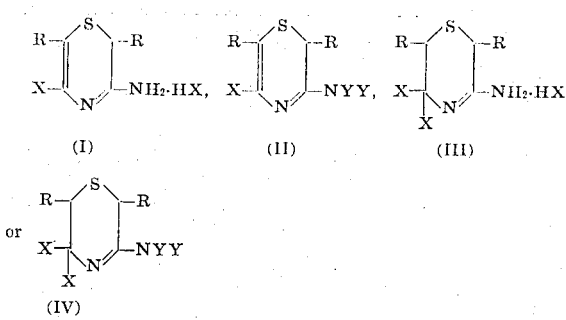

wherein X is chloro, bromo or iodo, R is hydrogen, phenyl, alkylphenyl, alkoxyphenyl, halophenyl, nitrophenyl, haloalkyl, nitro, halo, acetamido or lower alkyl carbethoxy and contains up to 10 carbon atoms, Y is hydrogen, alkylphenylsulfonyl, phenyl or

and $R_1$ is lower alkyl, lower haloalkyl, phenyl, nitrophenyl or halophenyl.

2. The compound defined in claim 1 wherein X is bromo.

3. The compound defined in claim 1 wherein Y is hydrogen or

4. The compound defined in claim 1 wherein R is hydrogen, phenyl, alkoxyphenyl or halophenyl.

5. The compound defined in claim 4 wherein X is bromo.

6. The compound defined in claim 5 wherein each R is hydrogen, phenyl, methoxyphenyl, ethoxyphenyl, chlorophenyl or bromophenyl.

7. The compound defined in claim 6 wherein Y is hydrogen, acetyl

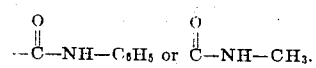

8. The compound defined in claim 7 wherein each Y is hydrogen.

9. The compound define in claim 8 wherein each R is hydrogen.

10. A process for preparing the compound defined in claim 1, Formula I or III, comprising reacting by contacting a compound of the formula NC—CH(R)—S—CH(R)—CN with at least three molar equivalents of HX at a temperature between about −50° and 50°C.

11. The process defined in claim 10 wherein X is bromo.

12. The process defined in claim 10 wherein the temperature is −5° to +5°C.

13. The process defined in claim 10 wherein the reaction product is further reacted with a base to produce a compound of the formula

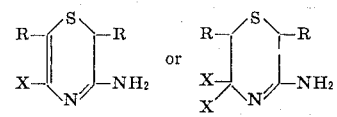

14. The process defined in claim 13 wherein the reaction product is further reacted with YX,

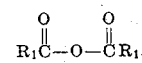

or $R_2NCO$ to produce a compound of the Formula II or IV.

15. The process defined in claim 14 wherein each X is bromo.

16. The process defined in claim 15 wherein at least one Y is

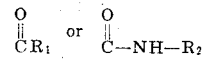

in the reaction product.

17. The process defined in claim 16 wherein one Y is hydrogen in the reaction product.

* * * * *